(12) United States Patent
Quix et al.

(10) Patent No.: US 11,162,460 B2
(45) Date of Patent: Nov. 2, 2021

(54) METHODS AND SYSTEMS FOR AN ENGINE WITH EXHAUST GAS RECIRCULATION

(71) Applicant: Ford Global Technologies, LLC, Dearborn, MI (US)

(72) Inventors: Hans Guenter Quix, Herzogenrath (DE); Andreas Kuske, Geulle (NL); Christian Winge Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/664,515

(22) Filed: Oct. 25, 2019

(65) Prior Publication Data

US 2020/0141366 A1 May 7, 2020

(30) Foreign Application Priority Data

Nov. 6, 2018 (DE) .......................... 102018218883.1

(51) Int. Cl.
*F02M 26/32* (2016.01)
*F01P 7/14* (2006.01)

(52) U.S. Cl.
CPC ............... *F02M 26/32* (2016.02); *F01P 7/14* (2013.01); *F01P 2007/146* (2013.01)

(58) Field of Classification Search
CPC ........ F01P 3/02; F01P 3/18; F01P 3/20; F01P 5/10; F01P 7/14; F01P 2007/146; F02M 26/32

USPC ............ 123/568.12, 568.16, 568.22, 568.31; 701/108, 114

See application file for complete search history.

(56) References Cited

U.S. PATENT DOCUMENTS

| 9,657,831 | B2 | 5/2017 | Nefcy et al. |
| 2002/0029755 | A1* | 3/2002 | Ito ........................... F02N 19/10 123/142.5 R |
| 2015/0129161 | A1* | 5/2015 | Nishikawa .............. F01P 7/165 165/43 |
| 2017/0022940 | A1 | 1/2017 | Minami et al. |
| 2017/0044947 | A1 | 2/2017 | Ueda |
| 2017/0298874 | A1 | 10/2017 | Kuske et al. |
| 2017/0335748 | A1* | 11/2017 | Zhang ....................... F01N 3/30 |
| 2017/0335805 | A1* | 11/2017 | Zhang ....................... F01N 3/20 |
| 2018/0066595 | A1* | 3/2018 | Dudar ................. F02D 41/0037 |
| 2018/0119624 | A1* | 5/2018 | Schwartz .................. F01N 5/02 |
| 2018/0156143 | A1 | 6/2018 | Hussain |

FOREIGN PATENT DOCUMENTS

| EP | 1170498 A1 | 1/2002 |
| WO | 2007113419 A1 | 10/2007 |

* cited by examiner

*Primary Examiner* — John Kwon
*Assistant Examiner* — Johnny H Hoang
(74) *Attorney, Agent, or Firm* — Geoffrey Brumbaugh; McCoy Russell LLP

(57) ABSTRACT

Methods and systems are provided for a cooling arrangement. In one example, the coolant arrangement comprises a heat store configured to store and release heat in response to a temperature of coolant flowing therethrough. The cooling arrangement further comprises an intake air heat exchanger for heating intake air prior to mixing with exhaust gas to decrease condensate formation, in one example.

8 Claims, 9 Drawing Sheets

METHODS AND SYSTEMS FOR AN ENGINE WITH EXHAUST GAS RECIRCULATION

CROSS REFERENCE TO RELATED APPLICATIONS

The present application claims priority to German patent application No. 102018218883.1, filed on Nov. 6, 2018. The entire contents of the above-listed application are hereby incorporated by reference for all purposes.

FIELD

The present description relates generally to operating a motor vehicle having an internal combustion engine with exhaust gas recirculation.

BACKGROUND/SUMMARY

Exhaust gas recirculation (EGR) is used to reduce emissions of nitrogen oxide ($NO_x$) which are produced during the combustion of fuel in internal combustion engines, such as gasoline or diesel engines, for example. It is efficient for the creation of nitrogen oxides to be reduced during the combustion process itself, since prescribed emission thresholds may not be met by only using exhaust gas after-treatment measures such as selective catalytic reduction and/or NOx storage catalytic converters, for example, which lead to a chemical reduction of nitrogen oxides.

During exhaust gas recirculation, exhaust gas is removed from the exhaust gas flow and mixed with the charge air. In this way, the oxygen fraction in the fuel/air mixture is reduced and the combustion temperature in the cylinders is thereby lowered.

Since nitrogen oxides may be created at high temperatures and pressures, the nitrogen oxide concentration emitted into the environment can be reduced by up to 50 percent via exhaust gas recirculation. In the case of diesel engines, exhaust gas recirculation also reduces the formation of soot particles by roughly 10 percent.

Particularly in the case of diesel engines, exhaust gas recirculation is one of the most important measures for lowering nitrogen oxide emissions. In the case of gasoline engines, exhaust gas recirculation also helps lower the load-change losses and thereby reduce fuel consumption in the partial load range still further.

While in the case of internal EGR an outlet valve, which may be controlled via cam shaft adjustment, remains temporarily open during the intake stroke, as a result of which exhaust gas is drawn back straight into the cylinder, with external EGR exhaust gas is removed from the exhaust tract and fed back to the intake duct via a line, a cooler, and a valve.

In this case, with low-pressure EGR (LP-EGR) removal takes place downstream of the exhaust gas aftertreatment and the exhaust gas is returned upstream of the turbo-compressor, while with high-pressure EGR (HP-EGR) removal takes place upstream of a turbine of the turbo-charger and before exhaust gas aftertreatment takes place and the exhaust gas is returned downstream of a charge air cooler and a throttle valve.

Low-pressure EGR is known for reducing the exhaust gas emissions of internal combustion engines, particularly in diesel engines. During operation, recycled exhaust gas is mixed with charge air upstream of the compressor wheel. Where engine operating conditions are below the dew point for water, this can lead to serious problems in relation to water condensation and/or snow/ice upstream of the condenser, which can cause damage to the compressor wheel.

Heating the charge air via a heated coolant from the engine cooling system is used to provide a partial solution to condensate formation. Coolant from the engine cooling system is controlled by a coolant check valve which facilitates the flow of coolant to a heater for charge air heating.

However, there may be no heated coolant available for heating the charge air subsequent to an engine start.

The problem addressed by the disclosure is therefore that of disclosing ways in which the operation of a motor vehicle having an internal combustion engine with exhaust gas recirculation can be further improved.

In one example, the issue of condensate formation is at least partially solved by a system, comprising an engine configured to receive low-pressure exhaust gas recirculate (LP-EGR), a cooling arrangement configured to flow coolant from the engine to one or more of a cooler, a heat store, and an intake air heat exchanger; and a controller with computer-readable instructions stored on non-transitory memory thereof that when executed enable the controller to select a first mode and flow coolant from the engine to only the cooler or a bypass when LP-EGR is not flowing and a cold-start is not occurring, select a second mode and flow coolant from the engine to the heat store and back to the engine in response to LP-EGR not flowing and a heat store amount being less than a threshold amount, select a third mode and flow coolant from the engine, to the heat store, and to the intake air heat exchanger in response to a condensate likelihood being greater than a threshold likelihood and a cold-start being present, and select a fourth mode and flow coolant from the engine directly to the intake air heat exchanger in response to the condensate likelihood being greater than the threshold likelihood and the cold-start being absent.

In this way, waste heat from the internal combustion engine can be used to heat up charge air when the internal combustion engine is still cold. Because waste heat from the internal combustion engine which would otherwise remain unused is stored temporarily, the fuel consumption of the motor vehicle is not increased.

According to one embodiment, in a further step thermal energy from the internal combustion engine is fed to the intake air heat exchanger performing a detour via the heat store. It is therefore possible to take account, for example, of the fact that the heat store is at the upper limit of its heat uptake capacity and is unable to store any further thermal energy. Furthermore, it is thereby possible to take account of the fact that there is a current demand for thermal energy at the intake air heat exchanger and a simultaneous supply of thermal energy to the heat store may lead to an under-supply of thermal energy to the intake air heat exchanger.

According to a further embodiment, in a further step no thermal energy is supplied to the heat store and the intake air heat exchanger. Consequently, no thermal energy is removed from the internal combustion engine, which allows particularly rapid heating of the internal combustion engine, particularly when said internal combustion engine is cold and ambient temperatures are particularly low. In one example, this may be desired during a cold-start.

According to a further embodiment, during the step involving the supply of thermal energy from the internal combustion engine to a heat store, in order to store the thermal energy in the heat store temporarily, coolant is channeled past a cooler of the internal combustion engine through a bypass. Hence, the efficiency of the cooling system is increased, as only coolant coming straight from the internal combustion engine is cooled by the cooler, not coolant from the heat store that has already been cooled.

In addition, the disclosure includes a computer program product, a control unit, an exhaust gas recirculation system with a control unit of this kind, an internal combustion engine with exhaust gas recirculation of this kind, and a motor vehicle with an internal combustion engine of this kind.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
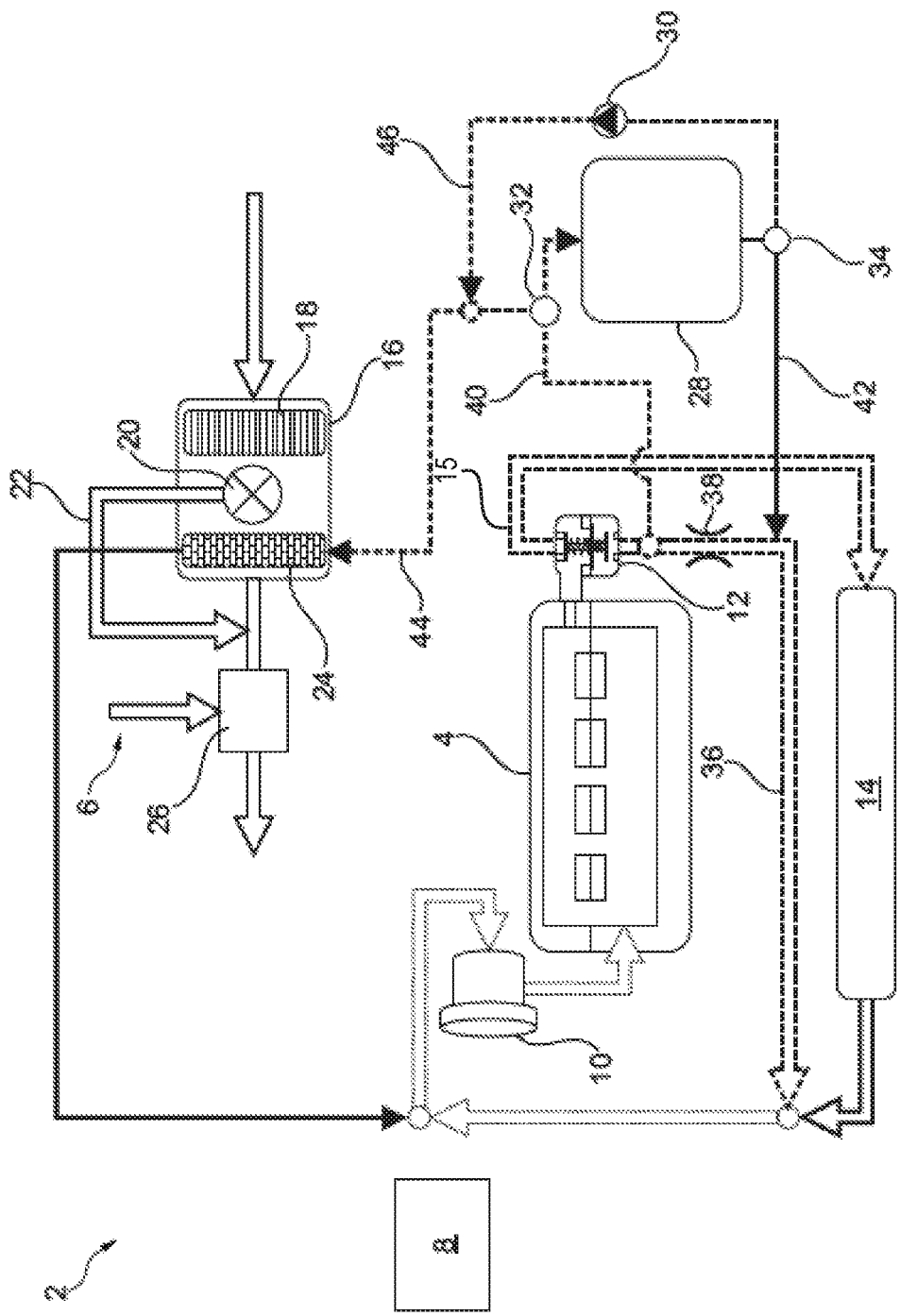
FIG. 1 shows a schematic representation of an internal combustion engine with an exhaust gas recirculation in a motor vehicle.
Figure 2:
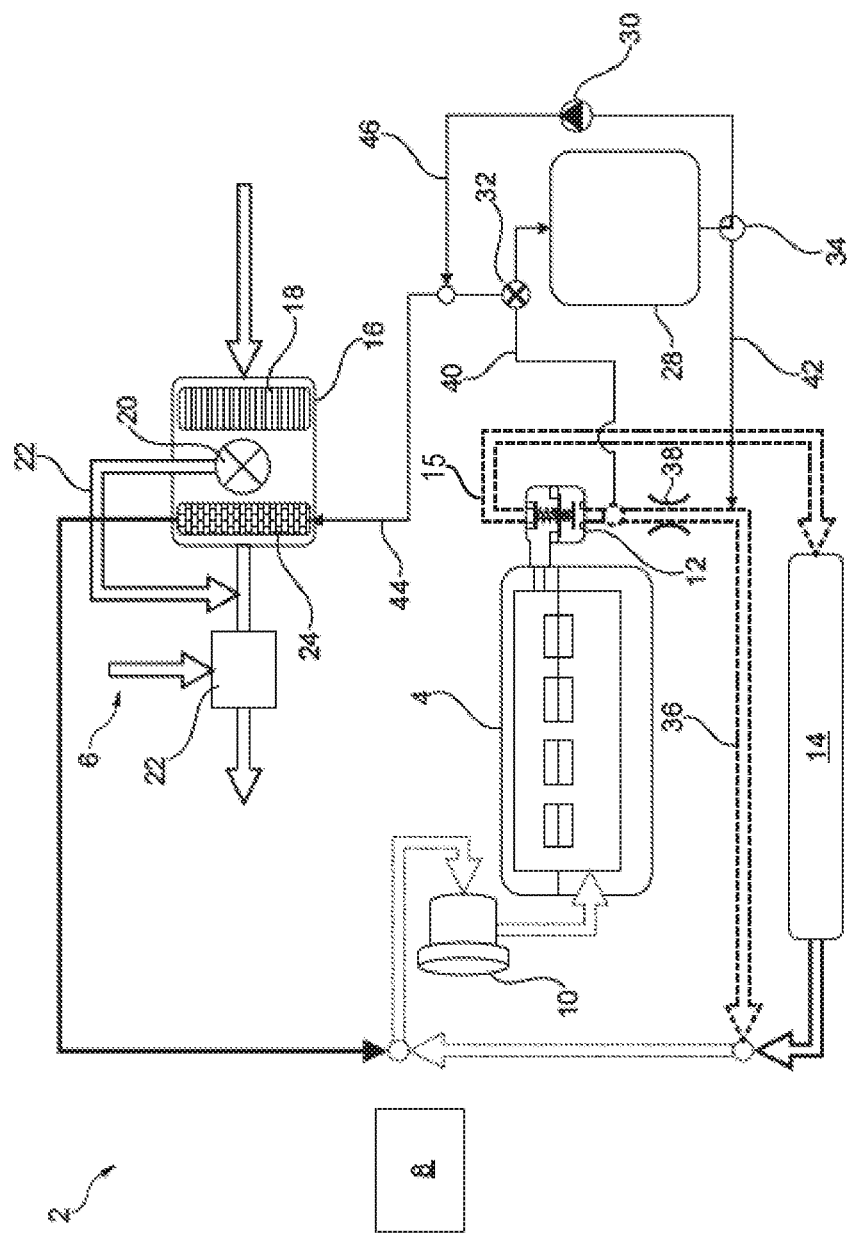
FIG. 2 shows the internal combustion engine of the motor vehicle with exhaust gas recirculation in a first mode.
Figure 3:
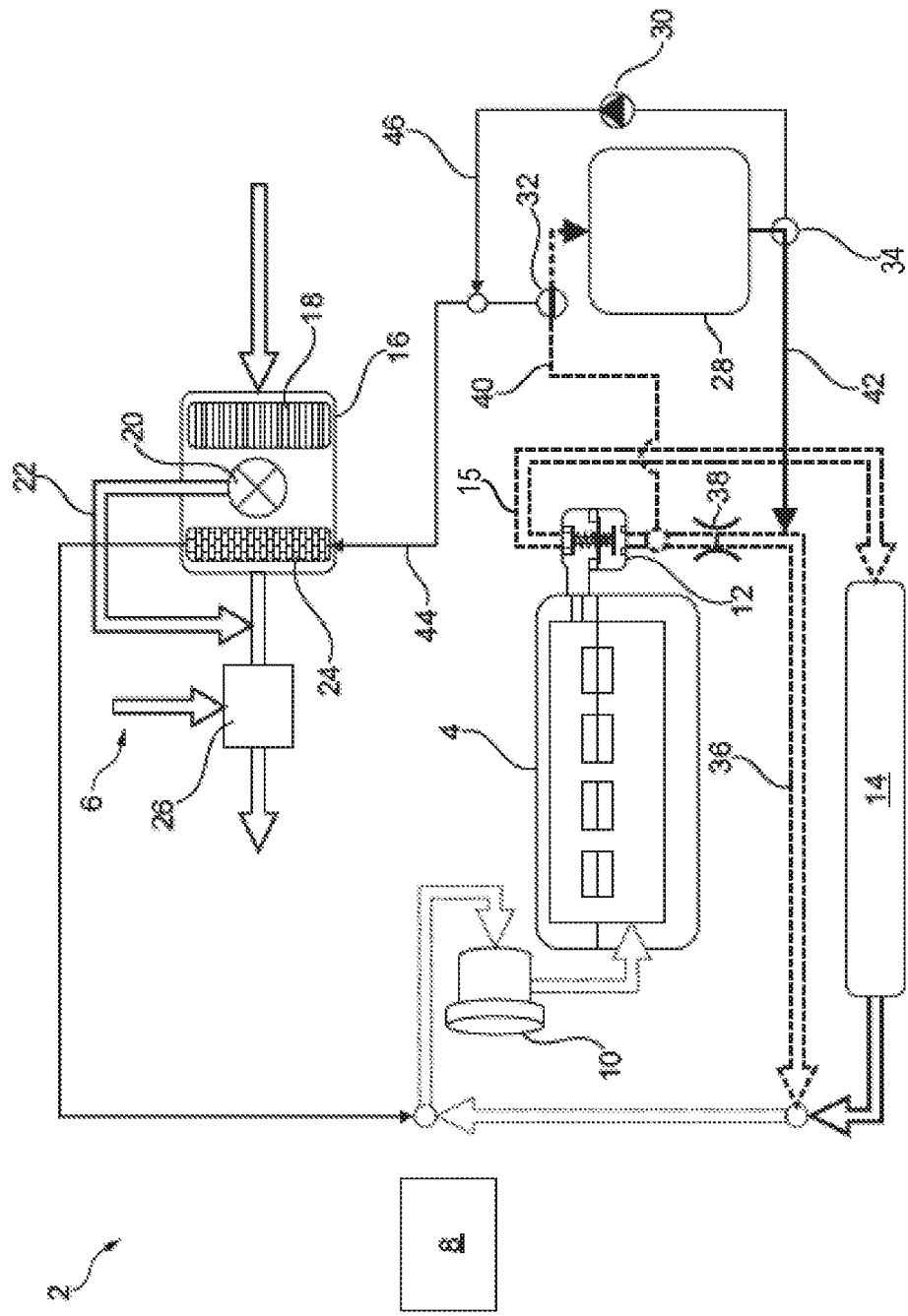
FIG. 3 shows the internal combustion engine of the motor vehicle with exhaust gas recirculation in a second mode.
Figure 4:
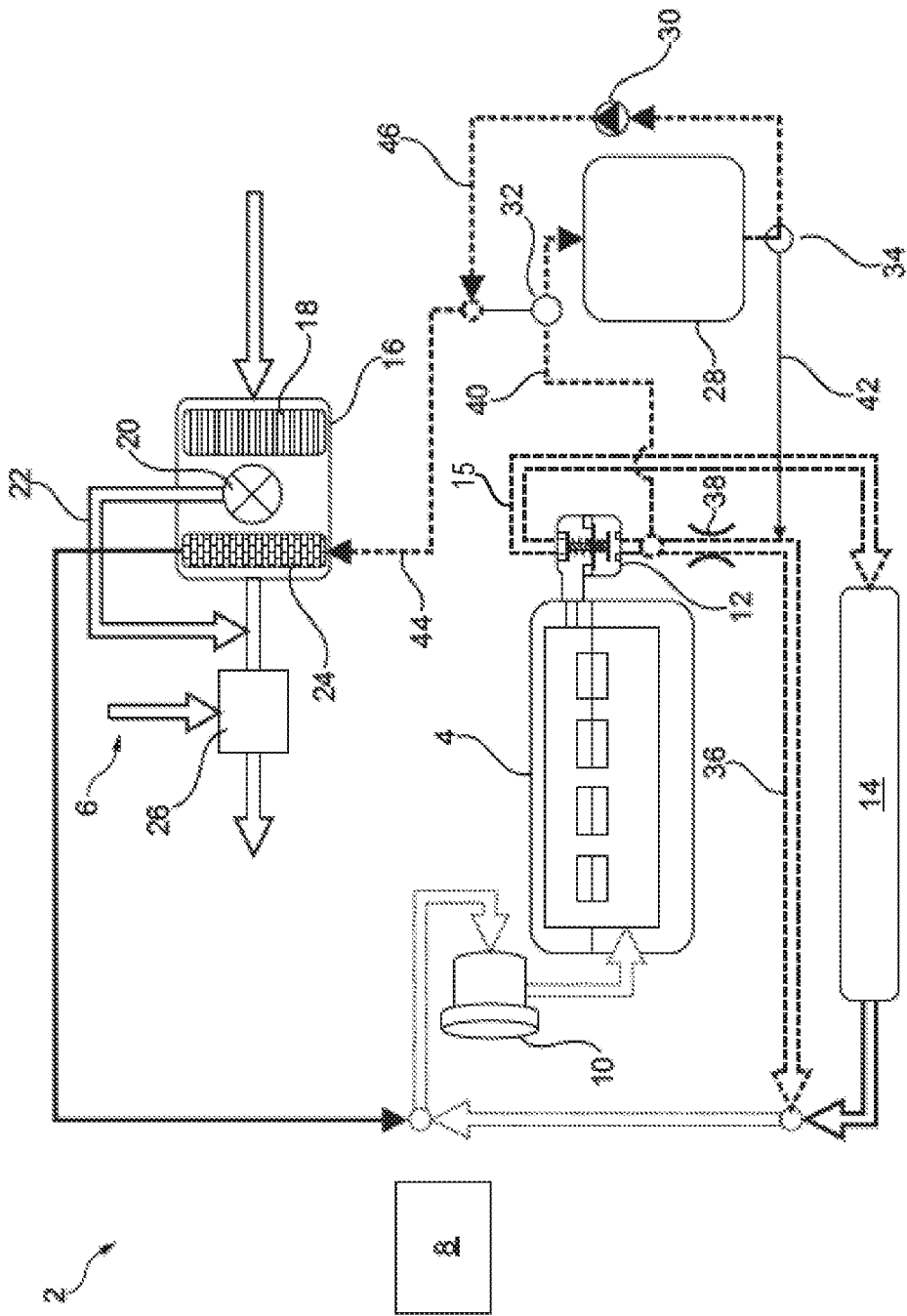
FIG. 4 shows the internal combustion engine of the motor vehicle with exhaust gas recirculation in a third mode.
Figure 5:
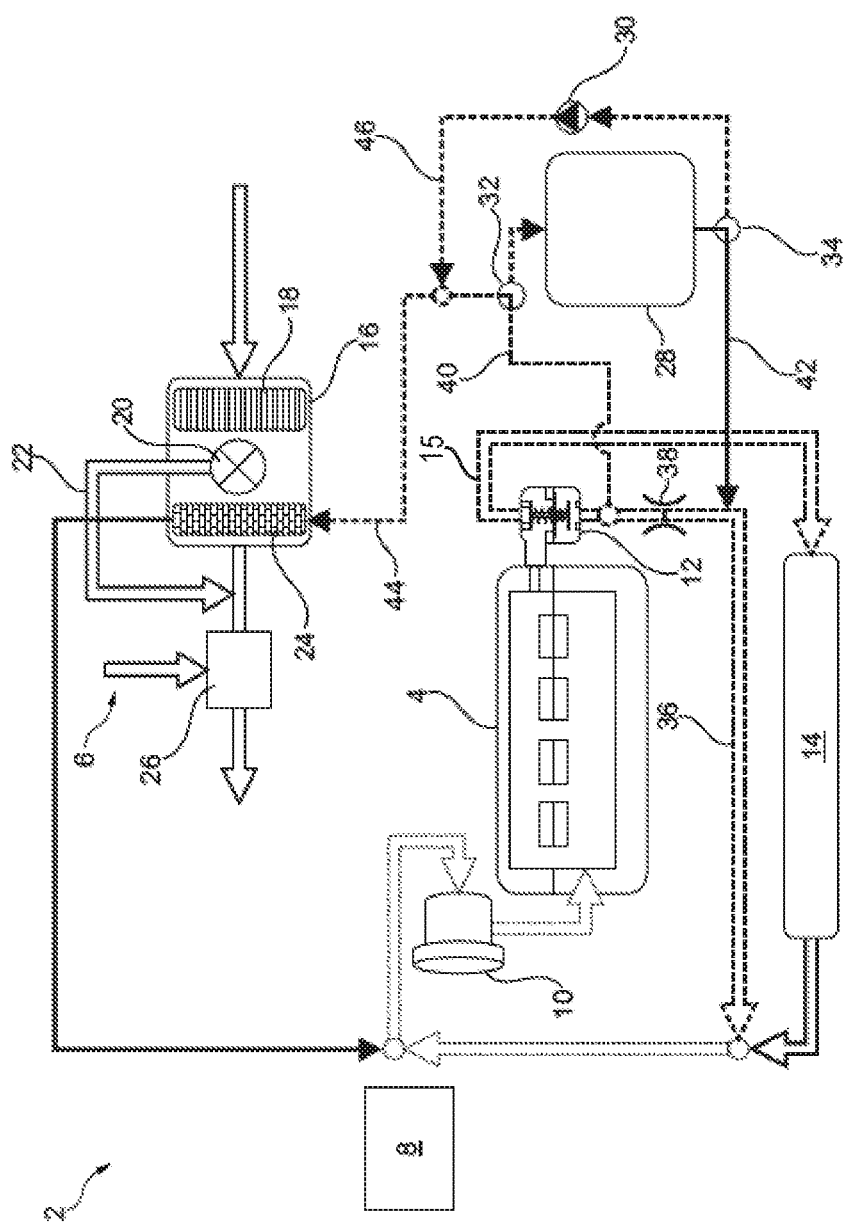
FIG. 5 shows the internal combustion engine of the motor vehicle with exhaust gas recirculation in a fourth mode.
Figure 6:
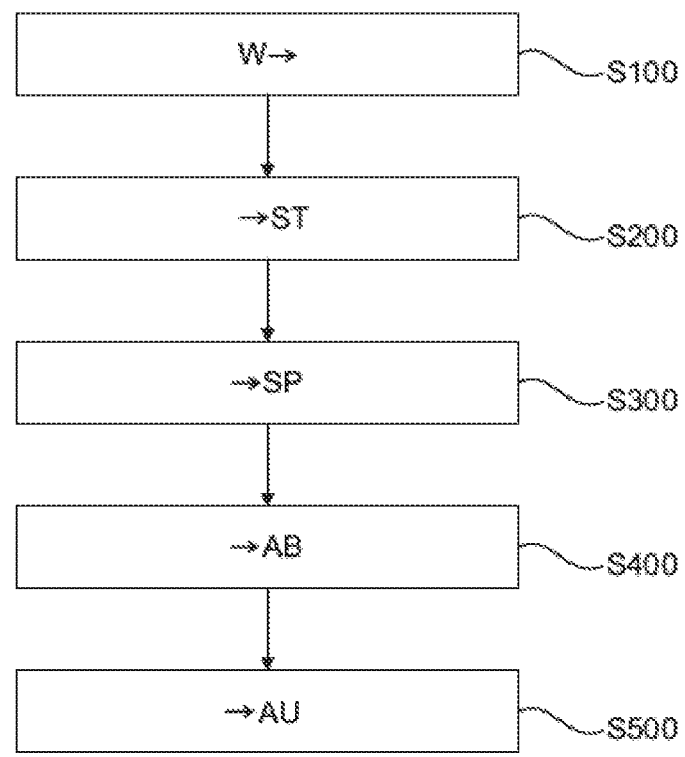
FIG. 6 shows a method for selecting between the first through fourth modes.
Figure 7:
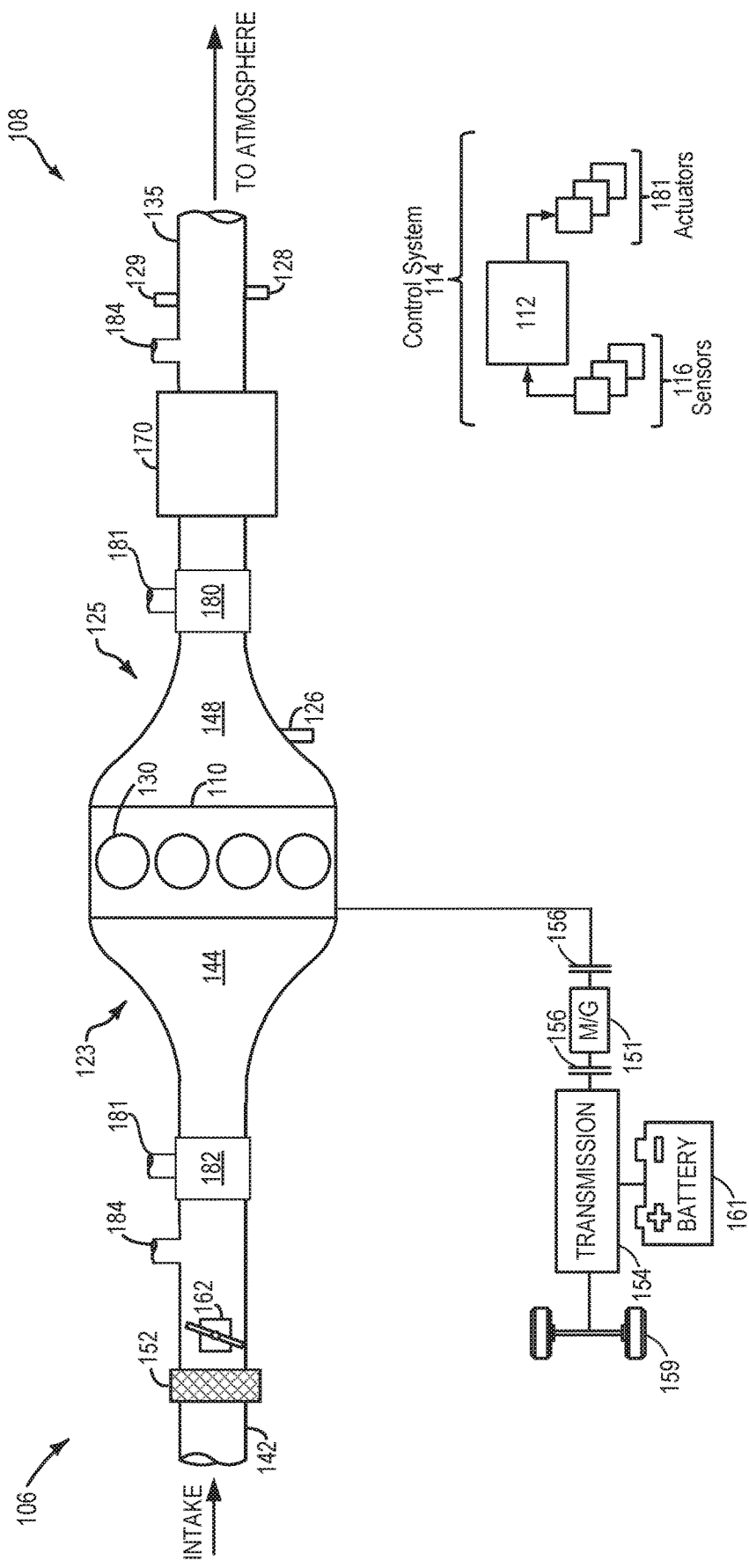
FIG. 7 shows an engine of a hybrid vehicle comprising a LP-EGR arrangement.
Figure 8:
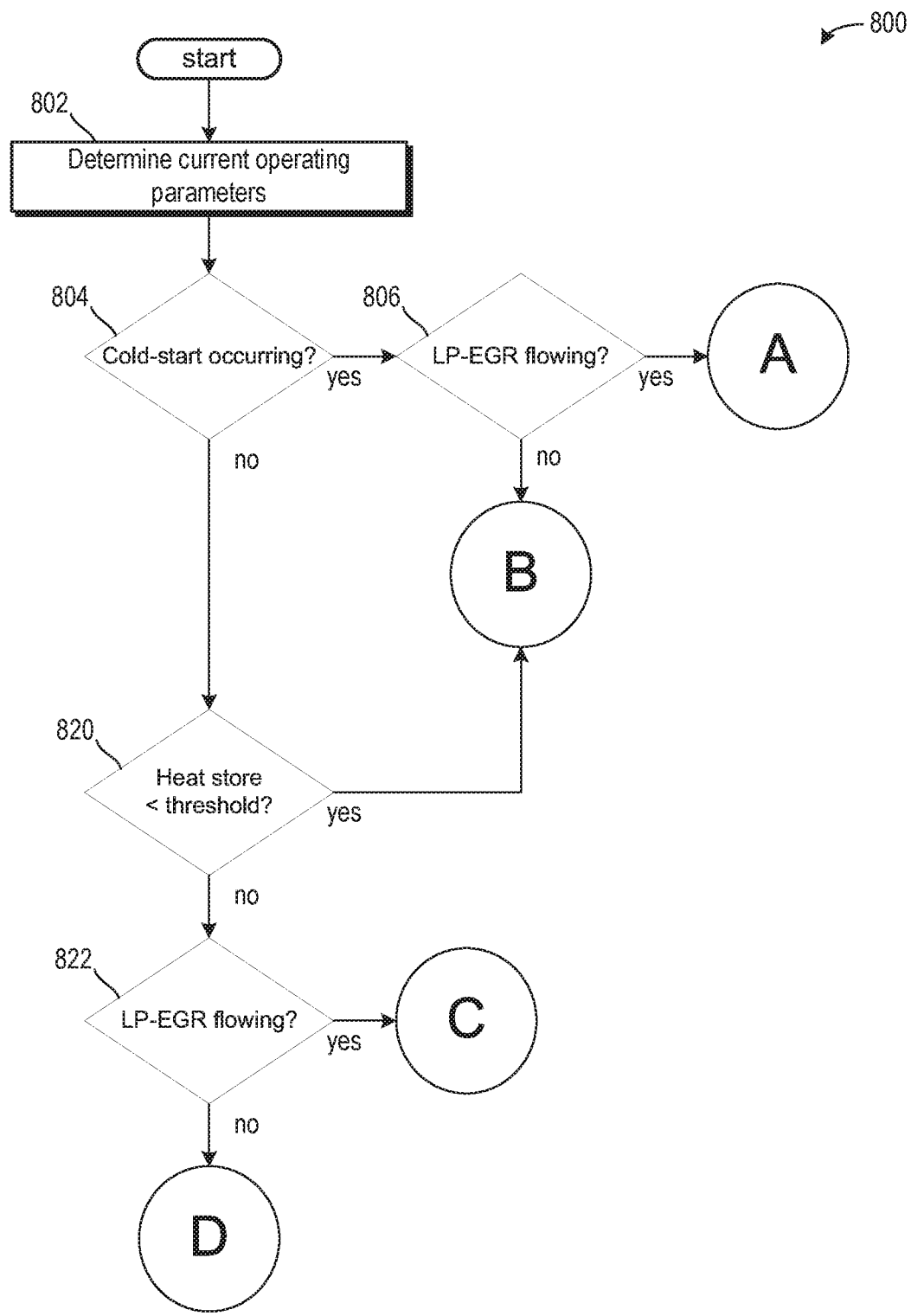
FIG. 8 illustrates a method for selecting between the first, second, third, and fourth modes.
Figure 8:
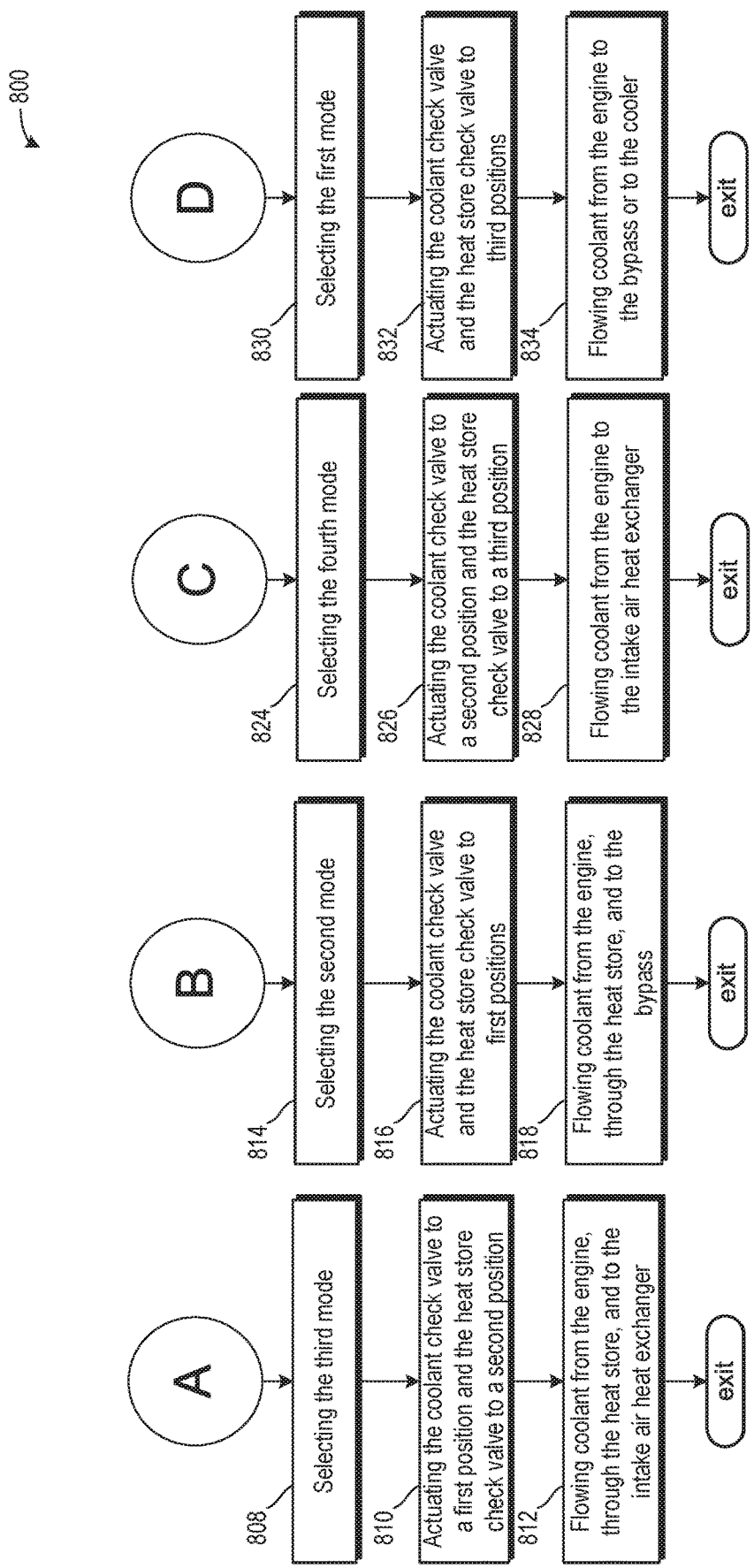

The following description relates to systems and methods for mitigating condensate formation when mixing exhaust gas recirculate with intake air. FIG. 1 shows a schematic representation of an internal combustion engine with an exhaust gas recirculation in a motor vehicle. FIG. 2 shows the internal combustion engine of the motor vehicle with exhaust gas recirculation in a first mode. FIG. 3 shows the internal combustion engine of the motor vehicle with exhaust gas recirculation in a second mode. FIG. 4 shows the internal combustion engine of the motor vehicle with exhaust gas recirculation in a third mode. FIG. 5 shows the internal combustion engine of the motor vehicle with exhaust gas recirculation in a fourth mode. FIG. 6 shows a method for selecting between the first through fourth modes. FIG. 7 shows an engine of a hybrid vehicle comprising a LP-EGR arrangement. FIG. 8 illustrates a method for selecting between the first, second, third, and fourth modes.

Turning now to FIG. 1, it shows an internal combustion engine 4 of a motor vehicle 2, in the present exemplary embodiment, an automobile.

The internal combustion engine 4 in the present exemplary embodiment is a turbo-charged diesel engine. Unlike in the present exemplary embodiment, the internal combustion engine 4 may also be a gasoline engine.

The internal combustion engine 4 is assigned exhaust gas recirculation 6 which, in the present exemplary embodiment, is in the form of low-pressure EGR (LP-EGR) which siphons off part of an exhaust gas flow downstream of an exhaust gas aftertreatment device for cleaning the exhaust gases from the internal combustion engine 4 and feeds it into a charge air flow upstream of a turbo-compressor of the turbocharger.

In order to control the internal combustion engine 4 with exhaust gas recirculation 6, a control unit 8 is provided which may comprise hardware and/or software components for the tasks and functions described below.

Of the components of a cooling circuit in the internal combustion engine 4, a water pump 10, a thermostat 12, and a cooler 14 are depicted in FIG. 1. The water pump 10 circulates the coolant, wherein the thermostat 12 directs a first partial coolant flow through the cooler 14 and a second partial coolant flow past the cooler 14, depending on the coolant temperature.

In addition, an air cleaning device 16 of the internal combustion engine 4 is shown. In the present exemplary embodiment, the air cleaning device 16 has an air filter 18 for cleaning the charge air in the flow direction of the charge air, and an air valve 20 for directing the filtered charge air through an intake air heat exchanger 24 inserted downstream in the flow direction or through an air bypass 22 to the intake air heat exchanger 24.

After leaving the intake air heat exchanger 24, the filtered and temperature-controlled charge air is mixed with the recycled exhaust gas in an EGR valve 26 in the exhaust gas recirculation 6.

Furthermore, the internal combustion engine 4 or the exhaust gas recirculation 6 is provided with a heat store 28 for the temporary storage of thermal energy, in the present exemplary embodiment waste heat from the internal combustion engine 4.

A supply line 40 in this case creates a coolant-conveying connection between the internal combustion engine 4 and the heat store 28. The supply line 40 can be opened and closed via a coolant check valve 32, in order to supply coolant heated by the internal combustion engine 4 to the heat store 28 as desired, so that thermal energy is thereby stored temporarily in the heat store 28.

In the present exemplary embodiment, the supply line 40 branches off downstream of the thermostat 12, namely in a line portion configured as a cooler bypass 36 to the cooler 14. In addition, the supply line 40 branches off in the cooler bypass 36 upstream of a throttle point 38.

Moreover, a further coolant-conducting connection 44 branches from the coolant check valve 32, via which coolant heated by the internal combustion engine 4 can be supplied to the intake air heat exchanger 24. Consequently, in the present exemplary embodiment, the coolant check valve 32 has three switch settings, namely a first switch setting in which coolant heated by the internal combustion engine 4 is supplied to the heat store 28 and a second switch setting in which coolant heated by the internal combustion engine 4 is supplied to the intake air heat exchanger 24, and also a third switch setting in which coolant heated by the internal combustion engine 4 cannot be supplied to either the intake air heat exchanger 24 or to the heat store 28.

A discharge line 42 allows coolant to be fed from the heat store 28 into the cooler bypass 36. For this purpose, the discharge line 42 can be opened and closed via a heat store check valve 34 in order to drain the heat store 28 when desired.

In addition, a further coolant-conveying connection 46 which opens into the other coolant-conducting connection 44 branches from the heat store check valve 34, namely downstream of the coolant check valve 32. In this way, warm coolant can be supplied via the coolant-conveying connection 46 from the heat store 28 to the intake air heat exchanger 24. An auxiliary water pump 30 is provided in the other coolant-conveying connection 46 for support or in order to convey the warm coolant.

Consequently, the heat store check valve 34 in the present exemplary embodiment has two switch settings, namely a first switch setting in which warm coolant is conducted from the heat store 28 into the cooler bypass 36 via the discharge line 42, and a second switch setting in which warm coolant is supplied to the intake air heat exchanger 24 from the heat store 28 via a combination of the coolant-conveying connection 46 and the coolant-conducting connection 44.

During operation, the control unit 8 triggers the auxiliary water pump 30, the coolant check valve 32, and the heat store check valve 34, in order to operate the internal combustion engine 4 or the exhaust gas recirculation 6 in a first mode (e.g., a standard mode), a second mode (e.g., a storage mode), a third mode (e.g., a delivery mode), and a fourth mode (e.g., a heating mode), which is explained with the help of FIGS. 2 to 5.

FIG. 2 shows operation in the first mode and/or the standard mode. In the first mode, the control unit 10 has moved the coolant check valve 32 into its third switch position and the heat store check valve 34 into its second switch position. The auxiliary water pump 30 is inactive. Depending on the existing engine temperature and the corresponding thermostat setting resulting from this, heated coolant flows from the internal combustion engine 4 both through the cooler 14 and also through the cooler bypass 36. However, neither the heat store 28 nor the intake air heat exchanger 24 is supplied with coolant heated by the internal combustion engine 4.

In one example, the first mode corresponds to a mode where each of the heat store 28 and the intake air heat exchanger 24 are heated via coolant from the engine 4. The operation of valves and pumps of the cooling arrangement are adjusted in response to coolant temperatures of the engine coolant. For example, if the coolant temperature is within a desired threshold temperature range, then the coolant may be directed to the cooler bypass as cooling via the cooler 14 is not desired. This may be executed via thermostat 12 leaking a portion of coolant from the engine into the bypass 36. However, if the coolant temperature is above the desired threshold temperature range, then cooling may be desired and the thermostat may open to flow coolant to the cooler 14 via a cooler line 15.

Turning now to FIG. 3, it shows an operation in the second mode and/or the storage mode. In the storage mode, the control unit 10 has signaled to actuators of the coolant check valve 32 to move the coolant check valve 32 into its first switch setting and the heat store check valve 34 into its first switch position. The auxiliary water pump 30 is inactive. In contrast to the first mode, heated coolant flows from the internal combustion engine 4 into the heat store 28. In addition, cooled coolant flows from the heat store 28 into the cooler bypass 36. However, the intake air heat exchanger 24 is not supplied with heated coolant.

In one example, the second mode is selected in response to the heat stored in the heat store 28 being less than a threshold heat store and the coolant temperature being greater than the desired threshold temperature range. In such an example, the supply line 40 may branch from the cooler line 15. Additionally or alternatively, the coolant temperature may be within 20% of an upper limit of the desired threshold temperature range for the second mode to be selected. At any rate, it may be desired that a cooling effect of the heat store 28 decrease the coolant temperature to a coolant temperature still within the desired threshold temperature range such that an engine operating temperature is maintained. During the second mode, the thermostat 12 may direct a portion of coolant into the bypass 36 from where the supply line 40 branches. A portion of coolant may enter the supply line 40 and flow through the coolant check valve 32 arranged in a first position, thereby allowing the coolant in the supply line 40 to flow to the heat store 28. The coolant may exit the heat store 28 and flow through the heat store check valve 34 arranged in a first position. The first position of the heat store check valve 34 may allow coolant from the heat store 28 to flow through a discharge line 42 and back into the bypass 36. In this way, an amount of heat retained in the heat store 28 may increase, thereby allowing the heat store 28 to heat coolant during a future cold-start.

Turning now to FIG. 4, it shows operation in the third mode and/or the delivery mode. In the delivery mode, the control unit 10 has moved the coolant check valve 32 into its first switch position and the heat store check valve 34 into its second switch position. The auxiliary water pump 30 is active. More or less heated coolant flows from the internal combustion engine 4 into the heat store 28. In addition, warm coolant flows from the heat store 28 to the intake air heat exchanger 24.

During the third mode, coolant exiting the heat store 28 is directed into the coolant conveying connection 46 via the second portion of the heat store check valve 34 and the auxiliary water pump 30 being active. The coolant may then flow through the coolant-conducting connection 44 and into intake air heat exchanger 24. By doing this, intake air may be heated, which may decrease a likelihood of condensate formation as the intake air is mixed with LP-EGR. In this way, the third mode may be selected in response to the coolant temperature being less than a temperature within the desired threshold coolant temperature range and LP-EGR being active. Additionally, the coolant may be cooled as it heats the intake air and return to the engine. In one example, the third mode is selected during a cold-start, wherein LP-EGR is active to decrease $NO_x$ emissions that may be generated during the cold-start.

Turning now to FIG. 5, it shows an operation in the fourth mode and/or the heating mode. In the heating mode, the control unit 10 has moved the coolant check valve 32 into its second switch setting and the heat store check valve 34 into its first switch position. The auxiliary water pump 30 is inactive. Heated coolant flows from the internal combustion engine 4 to the intake air heat exchanger 24. However, no heated coolant flows from the internal combustion engine 4 into the heat store 28.

The fourth mode may differ from the third mode in that the coolant temperature is equal to a temperature within the desired threshold coolant temperature range. As such, the coolant may be sufficiently warm and may not desire heating from the heat store 28. As such, the heat store 28 may be bypassed by positioning the coolant check valve 32 into its second position and flowing coolant directly from the supply line 40 to the coolant-conducting connection 44 and into the intake air heat exchanger 24.

In this way, a cooling arrangement of an engine system, comprises a thermostat configured to sense a temperature of coolant leaving an engine and direct the coolant to either a cooler line fluidly coupled to a cooler or to a bypass, a supply line fluidly coupled to the bypass, wherein the supply line comprises a first check valve configured to direct coolant to a heat store in a first position or to a coolant-conducting line in a second position, wherein a third position of the first check valve corresponds to a closed position, a discharge line fluidly coupled to the heat store, wherein the discharge line comprises a second check valve configured to direct coolant to the bypass in a first position or to a coolant-conveying line in a second position, wherein a third position of the second check valve corresponds to a closed position, and an intake air heat exchanger configured to heat intake air upstream of a junction where intake air mixes with low-pressure exhaust gas recirculate, wherein the intake air heat exchanger is fluidly coupled to the coolant-conducting line.

The engine system further comprises a controller with computer-readable instructions stored on non-transitory memory thereof that when executed enable the controller to signal to actuators of the first check valve and the second check valve to move the first and second check valves to respective third positions in response to a likelihood of condensate formation being less than a threshold likelihood and an amount of heat stored in the heat store being greater than or equal to a threshold amount when a coolant temperature sensed at the thermostat is not less than a desired threshold coolant temperature. The instructions further enable the controller to signal to actuators of the first and second check valves to move to the third position in response to the coolant temperature being greater than the desired threshold coolant temperature. The instructions further enable the controller to signal to the actuators of the first check valve and the second check valve to move the first and second check valves to respective first positions in response to the amount of heat stored in the heat store being less than the threshold amount when the coolant temperature sensed at the thermostat is not less than the desired threshold coolant temperature, wherein first positions of the first and second check valve direct coolant flow from the supply line, to the heat store, to the discharge line, and to the bypass. The instructions further enable the controller to signal an actuator of the first check valve to move the first check valve to the first position and an actuator of the second check valve to move the second check valve to the second position in response to the likelihood of condensate formation being greater than or equal to the threshold amount and wherein the coolant temperature is less than the desired threshold coolant temperature, further comprising where the instructions enable the controller to activate an auxiliary pump arranged in the coolant-conveying line to conduct coolant to the intake air heat exchanger. The instructions further enable the controller to signal to an actuator of the first check valve to a second position and to an actuator of the second check valve to a third position in response to the likelihood of condensate formation being greater than or equal to the threshold amount and the coolant temperature not being less than the desired threshold coolant temperature.

A process sequence and/or a method for operating the internal combustion engine 4 of the motor vehicle 2 with exhaust gas recirculation 6 shown in FIGS. 1 to 5 is explained with additional reference to FIG. 6.

The method begins at S100, which includes where the control unit 8 imports values W, e.g. representative of engine temperature, ambient temperature, and a charging state of the heat store 28 and determines whether the internal combustion engine 4 or the exhaust gas recirculation 6 is to be operated in standard mode ST, storage mode SP, delivery mode AB and heating mode AU.

If the internal combustion engine 4 or the exhaust gas recirculation 6 is to be operated in standard mode ST, in a further step S200 the control unit 8 moves the coolant check valve 32 into its third switch setting and the heat store check valve 34 into its second switch setting. The auxiliary water pump 30 is inactive.

If the internal combustion engine 4 or else the exhaust gas recirculation 6 is to be operated in storage mode SP, in a further step S300 the control unit 8 moves the coolant check valve 32 into its first switch setting and the heat store check valve 34 into its first switch setting. The auxiliary water pump 30 is inactive.

If the internal combustion engine 4 or the exhaust gas recirculation 6 is to be operated in delivery mode AB, in a further step S400 the control unit 8 moves the coolant check valve 32 into its first switch position and the heat store check valve 34 into its second switch position. The auxiliary water pump 30 is active.

If the internal combustion engine 4 or the exhaust gas recirculation 6 is to be operated in heating mode AU, in a further step S500 the control unit 8 moves the coolant check valve 32 into its second switch position and the heat store check valve 34 into its first switch position. The auxiliary water pump 30 is inactive.

Unlike in the present exemplary embodiment, the sequence of steps may also be different. In addition, multiple steps can also be performed at the same time or simultaneously.

In this way, the operation of a motor vehicle 2 with exhaust gas recirculation 6 can be further improved, since waste heat from the internal combustion engine 4 is used to heat charging air when the internal combustion engine 4 is still cold. Since waste heat from the internal combustion engine 4 which would otherwise remain unused is temporarily stored, the fuel consumption of the motor vehicle 2 is not increased.

In one example, a method, comprises selecting a first mode in response to an engine coolant temperature not being less than a desired threshold coolant temperature range, an amount of heat stored in a heat store being greater than or equal to a threshold amount, and a likelihood of condensate formation due to LP-EGR mixing with intake air being less than a threshold likelihood, selecting a second mode in response to either the engine coolant temperature being within the desired threshold coolant temperature range and the amount of heat stored in the heat store being less than the threshold amount or the engine coolant temperature being less than the desired threshold coolant temperature range and the amount of heat stored in the heat store being greater than or equal to the threshold amount, selecting a third mode in response to the likelihood of condensate formation being greater than or equal to the threshold likelihood and either the engine coolant temperature being less than the desired threshold coolant temperature range or the amount of heat stored in the heat store being less than the threshold amount, and selecting a fourth mode in response to the engine coolant temperature being within the desired threshold coolant temperature range and the amount of heat stored in the heat store being greater than or equal to the threshold amount.

The method may further comprise flowing coolant from the engine to a thermostat configured to adjust coolant flow to a bypass or a cooler in response to the engine coolant temperature during the first mode, wherein the thermostat directs coolant to the cooler in response to the engine coolant temperature being greater than the desired threshold coolant temperature range, wherein the thermostat directs coolant to the bypass and not to the cooler in response to the engine coolant temperature being within the desired threshold coolant temperature range. In one example, flowing coolant from the engine to a supply line fluidly coupled to the bypass, wherein the supply line comprises a first check valve configured to flow coolant from the check valve to the heat store when in a first position of the first check valve during the second mode, further comprises flowing coolant from the heat store to a second check valve configured to flow coolant to a discharge line when in a first position of the second check valve. The discharge line is fluidly coupled to a portion of the bypass downstream of the thermostat. The method further comprises flowing coolant from the engine to the supply line, through the first check valve in the first position of the first check valve and to the heat store during the third mode, further comprising flowing the coolant from the heat store to the second check valve in a second position, flowing coolant from the second position of the second check valve to a coolant-conveying connection comprising an auxiliary pump, which is activated during the third mode and promote coolant flow to a coolant-conducting connection, and to the intake air heat exchanger. The method further comprises flowing coolant from the engine to the supply line, through the first check valve in a second position of the first check valve, and to the coolant-conducting connection, and to the intake air heat exchanger during the fourth mode. The auxiliary pump is deactivated during the first mode, the second mode, and the fourth mode. The first check valve and the second check valve are electronically controlled.

Turning now to FIG. 7, it shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, selective catalytic reduction (SCR) device, particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

The engine system may further comprise a turbine 180, a compressor 182, and a shaft 181 mechanically coupling the turbine 180 to the compressor 182. The engine system further comprises a LP-EGR passage 184 arranged downstream of the emissions control devices 170 and the turbine 180. The LP-EGR passage 184 siphons exhaust gas from the exhaust passage 135 from downstream the emissions control devices 170 and routes the exhaust gas to a portion of the intake passage 142 upstream of the compressor 182. In one example, the hybrid vehicle system 106 is a non-limiting example of the motor vehicle 2 of FIG. 1. As such, the engine 110, may be used similarly to engine 4 and controller 112 may be used similarly to control unit 8 of FIG. 1.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

In this way, FIGS. 1-7 show a system, comprising an engine configured to receive low-pressure exhaust gas recirculate (LP-EGR). A cooling arrangement may be configured to flow coolant from the engine to one or more of a cooler, a heat store, and an intake air heat exchanger. A controller with computer-readable instructions stored on non-transitory memory thereof that when executed enable the controller to select a first mode and flow coolant from the engine to only the cooler or a bypass when LP-EGR is not flowing and a cold-start is not occurring, select a second mode and flow coolant from the engine to the heat store and back to the engine in response to LP-EGR not flowing and a heat store amount being less than a threshold amount, select a third mode and flow coolant from the engine, to the heat store, and to the intake air heat exchanger in response to a condensate likelihood being greater than a threshold likelihood and a cold-start being present, and select a fourth mode and flow coolant from the engine directly to the intake air heat exchanger in response to the condensate likelihood being greater than the threshold likelihood and the cold-start being absent.

The second mode further comprises the cold-start being absent. A thermostat is arranged at an intersection between a cooler line and the bypass, and wherein the thermostat is configured to direct coolant to the cooler line in response to a coolant temperature being less than a lower limit of a desired threshold coolant temperature range. Coolant does not flow through the cooler line during the second, third, and fourth modes. The cooler is arranged along the cooler line. The heat store comprises a phase-change material.

FIGS. 1-5 and 7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 8, it shows a method 800 for selecting between the first mode, second mode, third mode, and fourth mode. Instructions for carrying out method 800 and method of FIG. 6 may be executed by a controller (e.g., controller 112 of FIG. 7 or control unit 8 of FIG. 1) based on instructions stored on a memory of the controller and in conjunction with signals received from sensors of the engine system, such as the sensors described above with reference to FIG. 7. The controller may employ engine actuators of the engine system to adjust engine operation, according to the methods described below.

The method 800 begins at 802, which includes determining current operating parameters. Current operating parameters may include, but are not limited to, one or more of a manifold vacuum, throttle position, engine load, engine temperature, vehicle speed, EGR flow rate, and air/fuel ratio. The engine temperature may be determined via a temperature sensor arranged in a coolant jacket within or proximal to the engine. The EGR flow rate may be determined via an exhaust gas flow sensor.

The method 800 proceeds to 804, which includes determining if a cold-start is occurring. A cold-start may be occurring if an engine temperature is less than a lower threshold temperature. In one example, the lower threshold temperature corresponds to a lower limit temperature of the desired threshold coolant temperature range. Additionally or alternatively, the cold-start may be occurring if an ambient temperature is less than a threshold ambient temperature.

If the cold-start is occurring, then the method 800 proceeds to 806 to determine if LP-EGR is flowing. If LP-EGR is flowing, then the method proceeds to 808, which includes selecting the third mode. The third mode may also correspond to the delivery, as described above with respect to FIG. 4. The method 800 proceeds to 810, which includes actuating the coolant check valve to a first position and the heat store check valve to a second position. Additionally or alternatively, the auxiliary water pump may be activated.

The method 800 proceeds to 812, which comprises flowing coolant from the engine, through the heat store, and to the intake air heat exchanger. More specifically, coolant may flow from the engine, to the thermostat, to the supply line, to the heat store, to the coolant conveying connection, to the coolant conducting connection, and to the intake air heat exchanger. In this way, cold coolant from the engine may be heated by the heat store and then used to heat intake air to decrease a likelihood of condensate formation when the intake air mixes with LP-EGR.

Returning to 806, if LP-EGR is not flowing, then the method 800 proceeds to 814, which comprises selecting the second mode. In the present example, the second mode corresponds to a cold-start mode, wherein the heat store device is utilized to accelerate coolant warm-up to decrease a cold-start duration.

The method 800 proceeds to 816, which includes actuating the coolant check valve and the heat store check valve to first positions. The method 800 proceeds to 818, which includes flowing coolant from the engine, through the heat store, and to the bypass. As such, the coolant is returned to the engine without flowing to the cooler. More specifically, the low-temperature coolant may flow through the thermostat, into the bypass, to the supply line, through the coolant check valve, to the heat store, through the heat store check valve, through the discharge line, and back to the bypass. By doing this, the coolant temperature may be increased via heat stored in the heat store. As such, the heat store may comprise a phase-change material (PCM) or other similar material that is able to store and release heat without electrical or mechanical connections.

Returning to 804, if a cold-start is not occurring, then the method proceeds to 820, which includes determining if a heat store amount is less than a threshold amount. The threshold amount may be equal to 80%. Thus, if less than 80% of the heat store is storing heat, then the method proceeds to 816 as described above. However, in the present example, the second mode is a storage mode, and not a cold-start mode. In this example of the second mode (e.g., the storage mode), the engine coolant heats the heat store such that the amount of heat stored in the heat store increases. Regardless, coolant flow follows the same direction described above from 814 to 818 and with respect the example of FIG. 3.

If the heat store amount is greater than or equal to the threshold amount, then the method 800 proceeds to 822, which includes determining if LP-EGR is flowing. If LP-EGR is flowing, and the cold-start is not occurring and the heat store amount is not less than the threshold amount, then the method 800 proceeds to 824, which includes selecting the fourth mode. In one example, the fourth mode is a heating mode, as described above with respect to FIG. 5.

The method 800 proceeds to 826, which includes actuating the coolant check valve to a second position and the heat store check valve to a third position. Additionally, the auxiliary water pump is deactivated. The method 800 proceeds to 828, which includes flowing coolant from the engine to the intake air heat exchanger. More specifically, the coolant flows from the bypass, to the supply line, through the coolant conducting line, and to the air intake heat changer. In this example, the engine coolant may be sufficiently warm to heat the intake air and mitigate condensate formation following mixing with LP-EGR without flowing through the heat store.

Returning to 822, if LP-EGR is not flowing, then the method 800 proceeds to 830, which includes selecting the first mode. The method 800 proceeds to 832, which includes actuating the coolant check valve and the heat store check valve to third positions. In one example, the third positions of the valves correspond to fully closed positions. The method 800 proceeds to 834, which includes flowing coolant from the engine to the bypass or to the cooler. Coolant flow to the bypass or the cooler may be adjusted via a sensed coolant temperature at the thermostat. If the coolant temperature is greater than a threshold temperature (e.g., the desired threshold coolant temperature range), then the thermostat closes and directs the coolant to a cooler line fluidly coupled to the cooler. If the coolant temperature is not greater than the threshold temperature, then the thermostat opens and directs coolant to the bypass without cooling the coolant.

In one example of the method 800, the first mode may be selected during any operating condition where the coolant temperature is greater than the desired threshold coolant temperature range. As such, even if LP-EGR is flowing and a likelihood of condensate formation is greater than a threshold likelihood, the first mode is selected if the coolant temperature is greater than the desired threshold coolant temperature range to mitigate degradation of the engine.

In this way, a cooling arrangement may be configured to adjust a coolant flow to decrease a cold-start duration and/or to decrease condensate formation due to LP-EGR flow. The technical effect of storing heat in a heat store device is to heat intake air and/or engine coolant during a cold-start or LP-EGR flowing events to decrease condensate formation and emissions.

In another representation, a method comprises operating a motor vehicle having an internal combustion engine with exhaust gas recirculation, comprising supply of thermal energy from the internal combustion engine to a heat store in order to store thermal energy in the heat store temporarily, and supply of the thermal energy temporarily stored in the heat store to an intake air heat exchanger in the internal combustion engine. The method further comprises thermal energy from the internal combustion engine is fed to the intake air heat exchanger making a detour via the heat store. The method further comprises no thermal energy is supplied to the heat store and the intake air heat exchanger. The method further comprises involving the supply of thermal energy from the internal combustion engine to a heat store in order to store the thermal energy in the heat store temporarily, coolant is channeled past a cooler of the internal combustion engine through a cooler bypass.

A control unit for operating a motor vehicle having an internal combustion engine with exhaust gas recirculation configured to supply thermal energy from the internal combustion engine to a heat store, in order to store the thermal energy in the heat store temporarily, and to supply the thermal energy temporarily stored in the heat store to an intake air heat exchanger in the internal combustion engine. The control unit is configured to supply thermal energy from the internal combustion engine to the intake air heat exchanger making a detour via the heat store. The control unit is configured such that no thermal energy is supplied to the heat store and the intake air heat exchanger. The control unit is configured such that when thermal energy from the internal combustion engine is supplied to a heat store, in order to store the thermal energy in the heat store temporarily, coolant is channeled past a cooler of the internal combustion engine through a cooler bypass.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method executed via instructions stored in non-transitory memory of a controller of an engine system, the controller configured to receive feedback from a thermostat configured to sense a temperature of coolant leaving an engine and direct the coolant to either a supply line fluidly coupled to a heat store or to a bypass, the method, comprising:

selecting a first mode in response to an engine coolant temperature not being less than a desired threshold coolant temperature range comprising a lower limit and an upper limit, an amount of heat stored in a heat store being greater than or equal to a threshold amount, and a likelihood of condensate formation due to LP-EGR mixing with intake air being less than a threshold likelihood, wherein the first mode further comprises flowing coolant from the engine, through the supply line, and to the heat store by actuating a coolant check valve to and a heat store check valve to third positions;

selecting a second mode in response to either the engine coolant temperature being within the desired threshold coolant temperature range and the amount of heat stored in the heat store being less than the threshold amount or the engine coolant temperature being less than the desired threshold coolant temperature range and the amount of heat stored in the heat store being greater than or equal to the threshold amount, wherein the amount of heat stored in the heat store is based on the engine coolant temperature and coolant flow through the heat store, and wherein the second mode further comprises flowing coolant from the engine, through the heat store, and to the bypass to increase the amount of heat stored in the heat store, the second mode comprising actuating the coolant check valve and the heat store check valve to first positions;

selecting a third mode in response to the likelihood of condensate formation being greater than or equal to the threshold likelihood and either the engine coolant temperature being less than the desired threshold coolant temperature range or the amount of heat stored in the heat store being less than the threshold amount, wherein the third mode further comprises flowing coolant from the engine, through the heat store, and to an intake air heat exchanger by actuating the coolant check valve to the first position and the heat store check valve to the second position; and selecting a fourth mode in response to the engine coolant temperature being within the desired threshold coolant temperature range and the amount of heat stored in the heat store being greater than or equal to the threshold amount, wherein the fourth mode further comprises flowing coolant from the engine to the intake air heat exchanger by actuating the coolant check valve to the second position and the heat store check valve to the third position.

2. The method of claim 1, further comprising flowing coolant from the engine to a thermostat configured to adjust coolant flow to the bypass or the cooler in response to the engine coolant temperature during the first mode, wherein the thermostat directs coolant to the cooler in response to the engine coolant temperature being greater than the desired threshold coolant temperature range, wherein the thermostat directs coolant to the bypass and not to the cooler in response to the engine coolant temperature being within the desired threshold coolant temperature range.

3. The method of claim 2, further comprising flowing coolant from the engine to a supply line fluidly coupled to the bypass, wherein the supply line comprises the coolant check valve configured to flow coolant from the coolant check valve to the heat store when in the first position of the first coolant check valve during the second mode, further comprises flowing coolant from the heat store to the heat store check valve configured to flow coolant to a discharge line when in a first position.

4. The method of claim 3, wherein the discharge line is fluidly coupled to a portion of the bypass downstream of the thermostat.

5. The method of claim 4, further comprising flowing coolant from the engine to the supply line, through the coolant check valve in the first position, and to the heat store during the third mode, further comprising flowing the coolant from the heat store to the heat store check valve in a second position, flowing coolant from the second position of the heat store check valve to a coolant-conveying connection comprising an auxiliary pump, which is activated during the third mode and promote coolant flow to a coolant-conducting connection, and to the intake air heat exchanger.

6. The method of claim 5, further comprising flowing coolant from the engine to the supply line, through the coolant check valve in a second position, and to the coolant-conducting connection, and to the intake air heat exchanger during the fourth mode.

7. The method of claim 6, wherein the auxiliary pump is deactivated during the first mode, the second mode, and the fourth mode.

8. The method of claim 6, wherein the first check valve and the second check valve are electronically controlled.

* * * * *